Aug. 5, 1969      A. M. TROWBRIDGE      3,458,943

MODEL AND METHOD FOR TEACHING HAIR AND WIG STYLING

Filed March 30, 1967

INVENTOR.
ALICE M. TROWBRIDGE
BY
Burd, MacEachron, Braddock,
Bartz & Schwartz
ATTORNEYS

United States Patent Office 3,458,943
Patented Aug. 5, 1969

3,458,943
MODEL AND METHOD FOR TEACHING HAIR AND WIG STYLING
Alice M. Trowbridge, 334 Busch Terrace, Minneapolis, Minn. 55409
Filed Mar. 30, 1967, Ser. No. 627,138
Int. Cl. G09b 29/00; A41g 3/00, 5/00
U.S. Cl. 35—59                    6 Claims

ABSTRACT OF THE DISCLOSURE

A model of a human head is covered with Velcro nylon loop binder material. Swatches of hair simulating material are bonded to wig fabric and a strip of Velcro nylon hook fastener material is provided around the periphery of such fabric. These swatches, when placed on the model, together form, with the model, a mannequin head having hair when can be shaped, curled, rolled, combed, back-combed and back-laced, brushed and smoothed into a finished style.

The method involves representing on the nylon binder covered head the outlines of areas of coverage of each swatch utilizing a geometric break-down of a circle; selectively fastening and removing swatches from their appointed positions on the model; and selectively rolling, curling and brushing an individual swatch and combinations of swatches when in position on the model to demonstrate the relationship of the hair attached to such swatch and swatches with respect to the total hair style.

Background of invention

The field of hair styling and the teaching of hair styling and the field of wig design and styling and the teaching of wig design and wig styling are highly susceptible to the use of audiovisual aids afforded by the present invention.

The importance of such aids is brought out by such prior art as U.S. Patent No. 3,101,557, in which a simulated head made of magnetic attractable material is provided with tubular members simulating roller curlers, with members simulating pin curls, and with magnetic means for holding such members to a simulated head. In using this model, the instructor selects a particular hair style and places simulated roller curlers and simulated pin curls in position with respect to each other to try to indicate how the hair should be handled to obtain the particular style. The student must accept this training on faith, as far as the model is concerned, and must attempt to duplicate the positioning of the rollers on a human head or on a model such as that disclosed in U.S. Patent No. 2,968,104. The difficulty with the model of Patent No. 3,101,557, and this teaching method is that it does nothing to demonstrate to the student the relationship between the final positioning in the finished style of the strands of hair that are to be wound on a particular roller with respect to the roots or origin of these hair strands.

U.S. Patent No. 2,968,104, above referred to, discloses a head of hair permanently fastened to a model, and has no advantage in teaching over the use of a live model except that of immobility and availability at all times.

Another patent in which a three-dimensional model is used to attempt to demonstrate a pattern for hair styling is shown in U.S. Patent No. 2,975,534. This model is an inflatable one, and the hair styling curl direction or curler positioning must be drawn on a flat surface and placed on the model or drawn directly on the model. In either case, the relationship of the positioning of the origin of a particular portion of hair strands to the finished hair style cannot be shown or even suggested.

Summary of the invention

A model head is encompassed with Velcro nylon loop binder material over the area normally covered by hair. This may be accomplished by the use of glue or other suitable adhesive agent. Individual swatches of wig material consist of human hair, or preferably, material simulating human hair which can be repeatedly rolled, curled, brushed, combed and shaped without the necessity of setting, fastened to diagonally cut wig fabric material. Each of such swatches is cut to fit a specific area on the head of the model. The sum total of such swatches, when in place on the model, covers the model with a complete simulated head of hair. A border of Velcro nylon hook fastener is bonded to the outer periphery of each swatch to allow the swatch to be removably fastened to the nylon loop binder on the head. The binder adhered to the head can conveniently be made up of segments of the same shape as that of the wig swatches, and the boundary of these binder segments on the model can be emphasized by the use of spacing between portions or by contrasting coloring. These segments can, together and separately, demonstrate the circle approach to hair styling and can represent a geometric break-down of such circle on the head.

In utilizing the model and in using the teaching method, an individual swatch of wig material will be removably fastened on the otherwise bare model head, and the relationship of the hair of the swatch to the remainder of the head can be demonstrated. The relationship of the entire length of the hair strands of the swatch to a roller or rollers upon which they can be wound and to the roots or origin of such group of strands, and the relationship of the finished curl after unwound from the curler to the remainder of the total hair style can also be demonstrated. These relationships are brought out with successive swatches, either combined with other swatches, or alone on the head, and are finally demonstrated with all of the swatches of hair in place on the head. After the hair styling or wig styling method has been effectively demonstrated in this manner, the students can perform their own work either on models of the invention or on human heads.

Description of the preferred embodiment

Figure 1:
FIG. 1 is a perspective view of a model head of the present invention showing all of the hair swatches in place thereon and showing the hair shaped into a finished casual styling, but with the base for supporting the model omitted.

A model of a human head 10 can be provided with a suitable base (not shown) for holding it in an upright position and can be covered with Velcro nylon loop material or fabric over that portion of the head which is normally covered by hair. Swatches of hair simulating material 12 include human hair or, preferably, material simulating human hair 13 which can be repeatedly rolled, curled, brushed and shaped without the necessity of setting; diagonally cut fabric 14 of the type useful in the wig making art, to which human hair or simulated hair is fastened; and Velcro nylon hook fastener material 15 bonded to such fabric. As shown, this fastener material is bonded to the fabric around the outer periphery thereof. The Velcro nylon loop and hook binder and fastener materials are of such nature as to firmly but temporarily bond to each other when the swatches of hair simulating material are pressed against that portion of the model of the human head which is customarily covered with hair.

Figure 5:
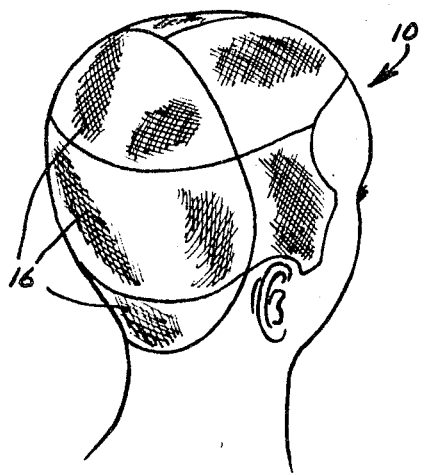
FIG. 5 is a perspective view from the position as seen in FIGS. 3 and 4, but with all swatches removed from the model, showing the Velcro nylon loop binder segments.
Figure 6:
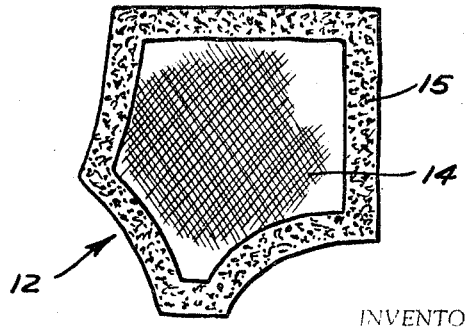
FIG. 6 is an enlarged view of the back of the swatch illustrated in FIG. 2 with the hair not shown, but showing the Velcro nylon hook fastener around the periphery of the swatch.

In order to emphasize the various areas of the head in visualizing the handling of the hair in hair styling or wig design and styling, the loop material is divided into a plurality of segments 16. As best seen in FIG. 5 these segments are shown as utilizing a geometric break-down of a circle, this concept having been found helpful in teaching students hair styling and wig design and styling. It is to be understood that other systems could be devised using other geometric break-downs of the area of the head normally covered with hair, and such systems would come within the teachings of this invention.

In order to emphasize the coverage of each segment 16, the segments can be spaced apart, or a contrasting color can be applied to the area between segments.

For each segment 16, there will be a corresponding swatch 12, of the same size and shape, and designed to fit exactly over this segment when utilized as a model and when utilizing the method of the invention.

Figure 2:
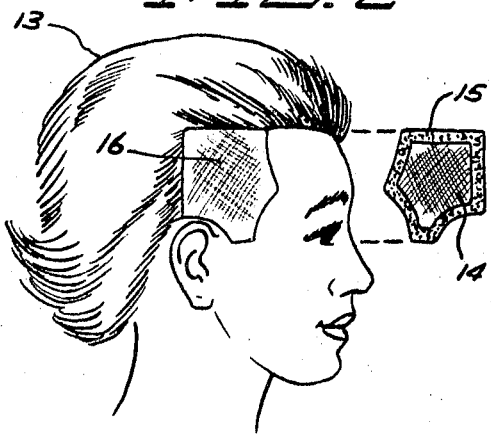
FIG. 2 is a side elevational view of the model of FIG. 1 with one of the swatches removed therefrom, showing the back-side of such swatch, with the hair of that particular swatch omitted for purpose of clarity.
Figure 3:
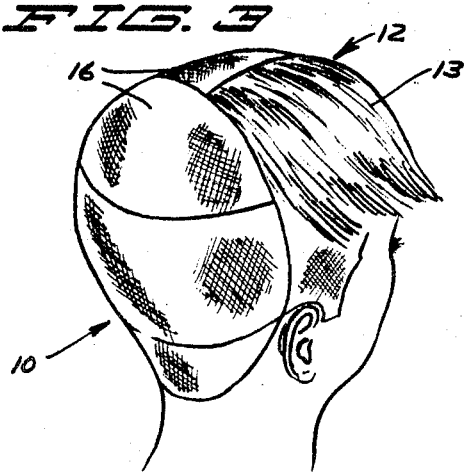
FIG. 3 is a perspective view of the model of the invention taken from the right side of the model, showing only one of the swatches in place and with the hair of such swatch combed out.
Figure 4:
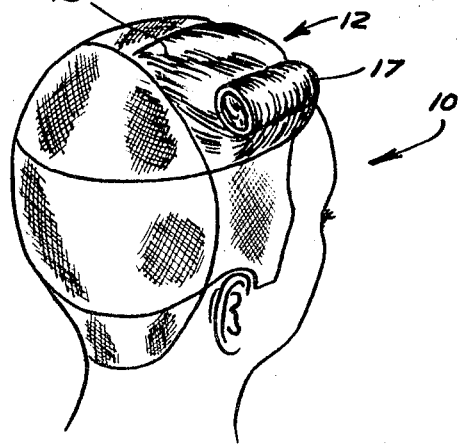
FIG. 4 is a perspective view from the same position as shown in FIG. 3 but with a portion of the hair of such swatch positioned on a roller.

One method of utilizing the invention can be that of demonstrating the completed hair style as seen, for example, in FIG. 1, and explaining the relationship of the hair from each of the parts of the head to that finished hair style. Next, a segment, such as the segment shown in FIG. 2 can be uncovered by pulling the matching swatch 12 away from it, thus demonstrating exactly the relationship of the hair of that swatch to the finished style as that portion of hair is removed from the model. Other swatches can be removed selectively to demonstrate the relationship of the hair of said swatches to the overall model, until at last the model appears as seen in FIGURE 5 with each of the segments 16 clearly visible. At this point, the geometric break-down of a circle can then be explained in detail. The hair style, or another one can then be built up by positioning one of the swatches over its corresponding segment, as shown, for example, in FIG. 3. The hair 13 of the swatch can be combed out as shown in that figure and then positioned on one or more rollers 17 as seen in FIGURE 4, for example. After the hair has been shaped by the roller, the roller can be removed, and the hair combed and shaped into its portion of the finished hair style, thus showing the relationship of the hair of this swatch to the finished style. The hair of this swatch can then be left in its styled position, can be combed out of the way, or positioned on a roller, or the swatch can be completely removed, while one or more of the other swatches are temporarily fastened on the model and the hair thereon used to demonstrate the hair style as explained above.

The embodiments of the invention in which an exclusive property or privilege is claimed are defined as follows:

1. A model for use in the art of hair styling comprising:
   (a) a simulated head,
   (b) first fastening material covering the hair area of the head,
   (c) a plurality of swatches of hair simulating material each including
      (1) wig fabric,
      (2) hair simulating material or hair bonded to a first side of said wig fabric, and
      (3) second fastening material bonded to a second side of said wig fabric, said second fastening material being capable of repeatedly adhering to and being separated from said first fastening material.

2. The combination as specified in claim 1 wherein said plurality of swatches when all in adhering relation to said simulated head are of size and shape to completely cover the hair area of said head.

3. The combination as specified in claim 2 wherein one of said first and second fastening materials includes a plurality of uniform loops extending outwardly from the rest of the material and the other of said fastening materials includes a plurality of uniform hooks extending outwardly from the remainder of said material, said hooks being adapted to temporarily engage matching loops to cause said materials to removably adhere to each other.

4. The combination as specified in claim 2 wherein said second fastening material is bonded to said wig fabric around the outer periphery thereof.

5. The combination as specified in claim 2 wherein said first fastening material is divided into segments, each segment matching exactly a swatch of hair simulating material designed to adhere to it.

6. The combination as specified in claim 5 wherein each segment is visually separated from its adjoining segments.

References Cited

UNITED STATES PATENTS

| | | | |
|---|---|---|---|
| 851,384 | 4/1907 | Sleicher | 132—53 |
| 1,387,161 | 8/1921 | Morrill | 35—59 |
| 1,490,479 | 4/1924 | Noel | 132—53 |
| 2,165,476 | 7/1939 | Greneker | 35—59 |
| 3,101,557 | 8/1963 | Watlington et al. | 35—59 |
| 3,316,669 | 5/1967 | Nachbar | 40—142 |
| 3,385,305 | 5/1968 | Buzzelli. | |

EUGENE R. CAPOZIO, Primary Examiner

HARLAND S. SKOGQUIST, Assistant Examiner

U.S. Cl. X.R.

132—53